United States Patent [19]

Gensike et al.

[11] 4,354,787
[45] Oct. 19, 1982

[54] MICROFICHE COLLATING STACKER

[75] Inventors: Karl H. Gensike, Northridge; Robert C. Marsh, Pacific Palisades, both of Calif.

[73] Assignee: Photomatrix Corp., Santa Monica, Calif.

[21] Appl. No.: 183,305

[22] Filed: Sep. 2, 1980

[51] Int. Cl.³ ............................................. B65H 33/08
[52] U.S. Cl. ..................................... 414/54; 271/213; 271/217; 414/100
[58] Field of Search ....................... 414/31, 54, 65, 66, 414/98, 100; 271/213, 215, 217

[56] References Cited

U.S. PATENT DOCUMENTS

| | | | |
|---|---|---|---|
| 3,006,258 | 10/1961 | Jochem | 414/54 X |
| 3,225,942 | 12/1965 | Fossenier | 414/66 X |
| 3,542,214 | 11/1970 | Helms | 414/98 X |
| 3,937,456 | 2/1976 | Gruodis et al. | 271/217 X |
| 3,964,741 | 6/1976 | Kroeker | 271/213 |
| 4,015,842 | 4/1977 | Perry | 414/54 X |

FOREIGN PATENT DOCUMENTS

| | | | |
|---|---|---|---|
| 633855 | 8/1936 | Fed. Rep. of Germany | 414/54 |
| 642928 | 4/1937 | Fed. Rep. of Germany | 271/215 |
| 682492 | 11/1952 | United Kingdom | 271/213 |

*Primary Examiner*—Leslie J. Paperner
*Attorney, Agent, or Firm*—Ralph B. Pastoriza

[57] ABSTRACT

The collating stacker comprises a hopper mounted for oscillation between first and second positions at right angles to each other. Individual microfiche are fed into the top of the hopper so that the microfiche can be received and stacked in the hopper to form a first set when the hopper is in the first position and a second set after the hopper has been rotated to its second position at right angles to the first position. By this arrangement, the first and second sets can be easily manually separated as they are removed from the hopper.

2 Claims, 2 Drawing Figures

MICROFICHE COLLATING STACKER

This invention relates generally to microfiche handling apparatus and more particularly to a microfiche collating stacker for stacking microfiche to form a first set with a given number of microfiche therein and a second set with either the same or a different given number of microfiche therein wherein the first and second sets can be easily manually separated after the stacking is completed.

BACKGROUND OF THE INVENTION

In microfiche duplicating apparatus, there may be a set of microfiche numbered 1 through 10, by way of example, on a master microfiche roll. A customer may wish to have five complete sets of the microfiche numbered 1 through 10. In such instance, the duplicating apparatus can be programmed to deliver single copies of fiche 1 through 10 in order, so that they will be collated, such set of 1 through 10 being repeated five times in a row. However, since the delivered microfiche copies are received in a hopper, all of the five sets of the microfiche 1 through 10 would normally be stacked on top of each other and it is then necessary for an operator after removing the entire stack from the hopper to separate out the respective sets of fiche 1 through 10. Such is a time consuming operation.

In other instances, a person may wish to have a first set of microfiche 1 through 10 and a second set of microfiche 11 through 13. Assuming that the customer wishes to have five copies of each of the first and second sets, there again would be encountered the problem of separating out the respective sets after the duplication had been completed even though the stack would be in an order that would help somewhat in separating out the fiche. For example, the first set of fiche 1 through 10 is printed and stacked and the process repeated five times. Thereafter, the second set of fiche 11 through 13 is printed and stacked and this latter process repeated five times, the five second sets being received on top of the five first sets. In sorting out the complete stack, the operator would know to first remove from the top the sets of fiche 11 through 13 and separate the same into separate piles. Thereafter, the five sets of fiche 1 through 10 are removed and separated into piles.

In other instances, a person may want 100 copies of a single microfiche such as fiche No. 1 and 75 copies of a second microfiche such as fiche No. 2 and perhaps 200 copies of a third microfiche such as fiche No. 3, and so forth. Again, the duplicating machine can be programmed to provide the desired number of copies of each fiche, but as in the case of the foregoing examples, all of the fiche come out in a single vertical stack in the hopper and must then be manually separated into the sets.

BRIEF DESCRIPTION OF THE PRESENT INVENTION

With the foregoing considerations in mind, the present invention contemplates the provision of a microfiche collating stacker for use with a microfiche duplicating apparatus such as described above wherein first and second sets of microfiche can be automatically stacked at right angles to each other in an interleaved manner to greatly facilitate separation of the sets after a duplicating operation has been completed.

More particularly, in accord with the present invention there is provided a collating stacker including a hopper mounted for rotation between a first position and a second position at right angles or 90° to the first position. Feed means are provided for delivering individual microfiche from the microfiche duplicator into the top of the hopper. The microfiche is received and stacked in the hopper to form a first set when the hopper is in its first position and received and stacked in the hopper to form a second set at right angles to the first set when the hopper is rotated to its second position. As a consequence, it is very easy to manually separate the respective sets when the microfiche are removed from the hopper.

BRIEF DESCRIPTION OF THE DRAWINGS

A better understanding of this invention, as well as further features and advantages thereof will be had by now referring to the accompanying drawings in which.

DETAILED DESCRIPTION OF THE INVENTION

Figure 1:
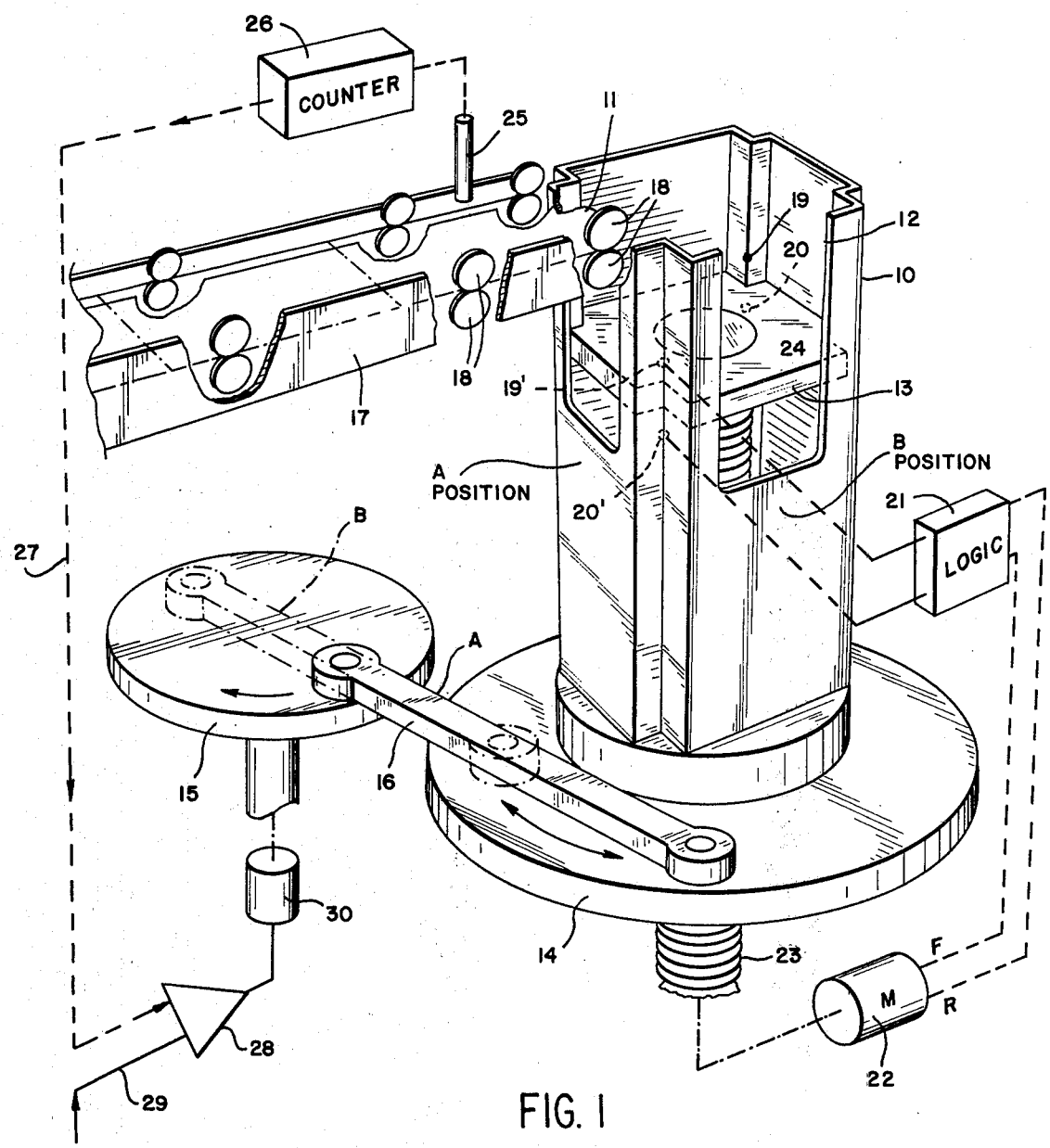
FIG. 1 is a perspective view partly diagrammatic in nature showing the microfiche collating stacker of this invention; and, FIG. 2 is an enlarged view of first and second sets of microfiche stacked by the collating stacker of FIG. 1.

Referring first to FIG. 1, the microfiche collating stacker includes a vertical hopper 10 having an interior of cruciform cross section for accommodating microfiche in the hopper when the hopper is in first and second positions at 90° to each other. Thus, there is shown a top entrance 11 when the hopper is in the particular position shown and a top entrance 12 at 90° to the top entrance 11, which will assume the position of entrance 11 when the hopper 10 is rotated 90°.

Shown disposed within the hopper is a vertically movable platform 13 for supporting microfiche arranged to be received in the hopper.

Referring to the lower portion of FIG. 1, there is shown an appropriate drive means for rotating the hopper 10 between the referred to first and second positions. Actually this drive means effects an oscillation of the hopper back and forth between the two positions involved and takes the form of a supporting rotary table 14 coupled to a drive disc 15 by means of a link 16. By making the diameter of the drive disc 15 equal to the distance between peripheral points circumferentially spaced 90° from each other on the rotor platform 14, it will be appreciated that rotation of the drive disc 15 in one direction continuously will result in a simple oscillation of the rotary platform 14 back and forth between its first and second positions.

For the sake of convenience in describing FIG. 1, the first position is designated A and the second position designated B. Thus, the entrance 11 described in FIG. 1 for the hopper corresponds to the A position and when the entrance 12 is positioned at the entrance 11 after rotation of the hopper, the B position is then assumed. Similarly, the solid line showing of the link 16 corresponds to the A position whereas the dotted line showing for the link 16 indicates the B position as indicated in FIG. 1.

Referring again to the upper portion of FIG. 1, there is shown a feed means in the form of a conveyor 17 provided with appropriate feed rollers such as indicated at 18 for automatically feeding duplicated microfiche individually into the top of the hopper 10. It will be understood that the microfiche are successively fed along the feed means 17 from the output of a microfiche duplicator which itself may be programmed to properly collate microfiche to form desired sets of microfiche. The hopper 10 and cooperating means to be described serves to collate the respective sets so that they can be easily manually separated.

In order that the full volume of the hopper can be utilized without the microfiche simply fluttering to the bottom of the hopper, the platform 13 is arranged to be moved downwardly as the stack of microfiche thereon increases. In this respect, there is provided a logic means which takes the form of upper and lower electric eyes. More particularly, there is shown at 19 and 20 appropriate light sources for directing beams of light diagonally across the interior of the hopper 10 in horizontal directions. Corresponding photo cells 19' and 20' are positioned on the diagonally interior opposite corner of the hopper for receiving the light beams from the light emitters 19 and 20.

When the platform 13 is in a completely down position, or in its lowermost position, both the beams from the light sources 19 and 20 will be received in the photo electric cells 19' and 20'. When the platform 13 is in a position above the light source 20, but below the light source 19, only the photo cell 19' will receive light while the photo cell 20' will be blocked from receiving light. In other words, the platform 13 itself or the supporting lead screw therefor blocks light from the source 20 whenever the platform 13 is above this light source.

It will also be appreciated that a stack of microfiche on the platform 13 if of sufficient height will block the upper light source beam from the light source 19 to the photo cell 19'. The logic means is indicated at 21 and connects to the photo electric cells 19' and 20' in a manner to operate a drive motor 22 connected to the platform lead screw 23. Whenever both the photo cells 19 and 20 are eclipsed as will result when the stack of microfiche is sufficiently high on the platform to interrupt the beam from the light source 19 to the photo cell 19', the motor 22 will be driven to rotate the lead screw 23 in a manner to lower the platform 13. When the platform 13 is lowered sufficiently so as to lower the top of the stack below the light beam from the source 19 to the photo cell 19', energization of the photo cell 19' will be detected in the logic circuit 21 and will stop the motor 22.

As microfiche continue to stack up on the platform 13, there will be reached a point where the stack is again sufficiently high to eclipse the horizontal beam from the light source 19 to the cell 19' and the motor 22 will again be actuated to lower the platform.

After the hopper is filled, and the microfiche are removed, then both the light sources 19 and 20 are exposed and free to be intercepted by the cells 19' and 20' so that both are energized. The logic 21, under these circumstances, will provide a signal to the motor 22 to cause it to rotate in a reverse direction and thus raise the platform 13 until it reaches a height to intercept the beam from the light source 20 to the cell 20'. It is then in position preparatory to receiving microfiche from the feed conveyor 17.

Summarizing, when both photo cells 19' and 20' are eclipsed, the platform 13 is caused to be lowered. When only cell 20' is eclipsed but cell 19' is free to receive light from the source 19, the platform 13 is held stationary. When both photo cells 19' and 20' are exposed to receive beams from the sources 19 and 20, the platform 13 is caused to move upwardly.

The structure described in FIG. 1 is completed by the provision of an appropriate sensor, counter and programming means for operating the drive disc 15 and thus controlling the oscillation of the hopper 10 between its first and second positions. More particularly, and again referring to the top portion of FIG. 1, there is indicated a sensing means 25 adjacent to the feed means 17 for providing a signal each time a microfiche passes the sensing means to be received in the hopper 10. A counter 26 is connected to receive the signals and count the same. The count output from the counter 26 is provided on an output lead 27.

A programming means in the form of a comparator 28 receives the count on line 27 and also receives a set-in reference count number on lead 29. When the count on lead 27 equals the reference count number set in on lead 29, there is provided an appropriate signal from the programming means 28 to a motor 30 to rotate the drive disc 15 exactly 180°. This action will move the rotary table 14° through 90° to position the hopper in its second or B position. An additional programmed number can be provided on the lead 29, so that when it is matched by the output from the counter 26, the motor 30 will be energized to again rotate the drive disc 15 through another 180° and in the same direction to oscillate back the hopper 10 to its original position.

It can readily be appreciated from the foregoing that any desired type of programming can be incorporated in the apparatus illustrated to cooperate with the collating program in the duplicating apparatus.

By way of example, assume as given in the earlier illustration it is desired to provide five copies of microfiche 1 through 10 inclusive. Under these circumstances, the given reference number would be 10, fed into the programmer 28 so that with the hopper 10 in the position shown in FIG. 1., the first ten duplicates corresponding to fiche 1 through 10 will be received in the hopper. When the counter 26 has counted the 10, a signal will be provided to the motor 30 to rotate the hopper 90° so that the B position and entrance 12 occupies the position formerly occupied by the A position and entrance 11. Ten more microfiche are then received in the hopper, these ten microfiche again being the original 1 through 10 microfiche to form a second set. The hopper is then again rotated 90° back to its original position by the drive disc 15 which is always rotated through 180° intervals in the same direction. A third set of microfiche 1 through 10 is then received and stacked in the hopper 10 and then again a rotation takes place, and so forth. After a total of 50 counts, the duplicating apparatus, through its own programming is turned off since it was initially desired to provide a total of 50 copies of microfiche in five sets of 10 each.

Figure 2:
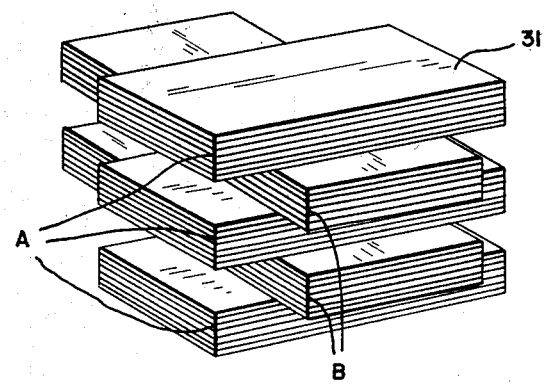

An operator can now remove the stacked sets of microfiche from the hopper 10 and they will be in the arrangement illustrated in FIG. 2 at 31. In FIG. 2, the first sets of microfiche received when the hopper is in the A position are designated by the letter A and the second sets of microfiche received are designated by the letter B and it will be noted that they are oriented at right angles to the first set. Thus, the same can easily be manually separated as a consequence of the stacking described.

It can also be appreciated from the foregoing that various other types of collating and stacking can be accomplished by the hopper arrangement. Thus, the reference count number and programmer 28 can be set so that the hopper will be rotated to the B position after a given number of microfiche have been received when in the A position and back to the A position after a different number of microfiche have been received in the B position. In other words, and again referring to FIG. 2, all of the A sets or stacks could have 10 microfiche whereas the B sets or stacks may have a different number, such as 5 or even 15 microfiche.

From all of the foregoing, it can thus be appreciated that the present invention has provided a microfiche collating stacker which will simplify operations and speed up the duplication of microfiche in various sets as desired.

We claim:

1. A microfiche collating stacker including, in combination:
   (a) a vertical hopper having an interior cruciform cross section for accommodating microfiche received in the top of the hopper when the hopper is in either first or second positions at 90° to each other;
   (b) a vertically movable platform in said hopper for supporting microfiche received therein;
   (c) drive means connected to said hopper for moving said hopper from one to the other of its positions when actuated;
   (d) feed means for delivery individual microfiche into the top of said hopper so that microfiche can be received and stacked in the hopper to form a first set when the hopper is in said first position and received and stacked in said hopper to form a second set at right angles to said first set when said hopper is in said second position;
   (e) sensing means adjacent to said feed means for providing a signal each time a microfiche passes into the hopper;
   (f) a counter for counting said signals;
   (g) programming means for rotating said hopper to one of its two positions whenever said counter has counted to a given reference count number so that the number of microfiche in each set received by the hopper when in said other of its positions corresponds to said reference count number; and
   (h) means for moving said platform downwardly whenever the top of a stack of microfiche in said hopper is within a given distance of said top of the hopper so that additional microfiche can be received in the hopper after the platform is lowered whereby said first and second sets of microfiche can be easily manually separated as they are removed from the hopper.

2. A collating stacker according to claim 1, in which said programming means is responsive to an additional given reference count number to rotate said hopper to the other of its two positions whenever said counter has counted to said additional given reference count number so that the number of microfiche in each set received by the hopper when in said one of its two positions corresponds to said additional reference count number.

* * * * *